United States Patent

Haugen

[11] 3,867,367
[45] Feb. 18, 1975

[54] SULFURIZED OLIGOMERIC PHOSPHORODIAMIDATE

[75] Inventor: Haakon Haugen, Beacon, N.Y.

[73] Assignee: Texaco Inc., New York, N.Y.

[22] Filed: Sept. 19, 1973

[21] Appl. No.: 398,615

Related U.S. Application Data

[62] Division of Ser. No. 210,238, Dec. 20, 1971, Pat. No. 3,810,838.

[52] U.S. Cl. .............................................. 260/125
[51] Int. Cl. ............................................. C10m 1/48
[58] Field of Search .................................... 260/125

[56] References Cited
UNITED STATES PATENTS
3,245,979  4/1966  Nelson et al. ................... 260/125

*Primary Examiner*—Lewis Gotts
*Assistant Examiner*—D. R. Phillips
*Attorney, Agent, or Firm*—T. H. Whaley; C. G. Ries

[57] ABSTRACT

The manufacture of oligomeric phosphorodiamidate characterized by the formula:

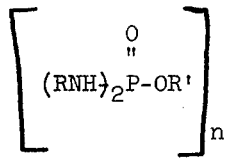

where R is alkaryl of from 12 to 24 carbons, R' is lower alkyl of from 2 to 6 carbons and $n$ is an average integer of from 1 to 4 and sulfurized derivatives thereof comprising contacting a primary amine of the formula:

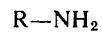

where R is as heretofore defined with an alkyldihalophosphate characterized by the formula:

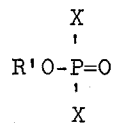

where R' is as heretofore defined and X is a halogen selected from chlorine or bromine utilizing a mole ratio of amine to said phosphate of between about 1.7:1 and 2.3:1 in the absence of solvent and catalyst at a temperature between about 170° and 200°C. while continuously blowing the reaction mixture with an inert gas, recovering the oligomeric phosphorodiamidate product and optionally contacting said product with phosphorus pentasulfide utilizing a mole ratio of pentasulfide to product of between about 0.05:1 and 0.5:1 at a temperature between about 80° and 150°C. in the presence of an inert solvent while continuously blowing the reaction mixture with an inert gas and recovering the sulfurized phosphorodiamidate reaction product. Both the phosphorodiamidate product and sulfurized phosphorodiamidate reaction product when incorporated in a hydrocarbon lubricating oil in an amount of between about 1.0 and 10 wt. % function as a combination corrosion, oxidation and wear inhibitor (load carrying and extreme pressure additive).

4 Claims, No Drawings

SULFURIZED OLIGOMERIC PHOSPHORODIAMIDATE

This is a division application of Ser. No. 210,238 filed Dec. 20, 1971, now U.S. Pat. No. 3,810,838.

BACKGROUND OF INVENTION

In the art of automotive lubrication there is a continuing search for additives which combine several functions such as oxidation inhibiting, corrosion inhibiting and load carrying (wear improving) abilities. One of the standard lube additives having this combined function of oxidation and corrosion inhibiting coupled with antiwear properties is zinc dialkyldithiophosphate. Although this material is very satisfactory, it does have the drawback of producing an ash when in contact with the high temperature areas of automotive engines such as in the exhaust valve region. Lubricant ash has been found to cause surface ignition in some gasoline engines, and to cause fire-ring sticking in diesel engines.

In order to obviate the ash forming problem, numerous ashless additives for lubricating oils have been developed. One such ashless additive is tri(t-dodecylphenyl)phosphoric triamide. Although this material functions as an oxidation and corrosion inhibitor in lubricating oils, it does not impart good load carrying characteristics in said oil. Another prior developed additive is the O,O-dialkyl phosphoroamidate derived from long chain primary aliphatic amines, e.g., O,O-dibutyl phosphoroamidate derived from a mixture of t-$C_{11}$–$C_{14}$ alkyl primary amines. Although this latter amidate imparted good load carrying properties to lubricating oils, it has no significant antioxidant effect. Thus, in order to impart both good oxidation and corrosion inhibiting effect and superior load carrying properties to a lubricating oil composition, it was necessary to employ both of the aforementioned ashless additives, whereas only a single additive was required in the case of the ash forming zinc dialkyldithiophosphate for the aforementioned properties. The use of multiple additives as opposed to a single additive to obtain a desired composite effect has economic disadvantages since it is normally more costly and requires a more complex blending procedure for the final lube composition.

Another prior problem in the art was in the preparation of the phosphoroamidate ashless additive, basic catalysts (e.g., alkyl amine) and solvent were required for satisfactory yields. The use of catalyst and solvent adds to process expense in terms of catalyst and solvent cost, added equipment and time for catalyst and solvent separation from the final product. Another preparation problem was phosphoroamidate amine hydrochloric salts were formed as by-products. To remove these by-product salts from the amidate or reduce them to an acceptable level requires extensive water washing and filtration. Water washing step in addition to solvent and catalyst cost substantially adds to process cost and complexity and is very time-consuming because of the formation of stable emulsions during said step.

SUMMARY OF INVENTION

I have discovered and this constitutes my invention a novel method of producing oligomeric phosphorodiamidic compounds and sulfurized derivatives thereof which when incorporated in hydrocarbon lubricating oils in an amount of between about 1.0 and 10 wt. % form a resulting composition of improved oxidation and corrosion resistance and of improved load carrying ability. More specifically, the invention relates to a solvent free, non-catalytic method of preparing the novel oligomeric phosphorodiamidates and sulfurized phosphorodiamidate derivatives in which a hydrochloric acid salt by-product is not formed, thereby resulting in improved economics and method simplicity.

DETAILED DESCRIPTION OF THE INVENTION

More specifically, my invention relates to the preparation of novel oligomeric O-alkyl-N,N'-bis(alkaryl) phosphorodiamidate which may be characterized for the sake of illustration by the formula:

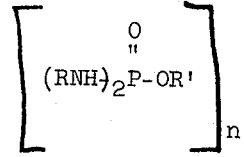

where R is alkaryl of from 12 to 24 carbons, R' is lower alkyl of from 2 to 6 carbons and $n$ is an average integer of from 1 to 4, inclusively having a phosphorus content between about 2 and 10 wt. %. The integer $n$ is determined to be average since the oligomeric product is in essence a mixture of diamidates of varying chain lengths. The sulfurized phosphorodiamidates contemplated herein are the reaction products of the aforedescribed phosphorodiamidates and phosphorus pentasulfide having a sulfur content between about 2 and 8 wt. % and a phosphorus content between about 4 and 16 wt. %.

The complexity of the reaction products require their description in terms of process since they are in essence a mixture of compounds containing mono- and polyalkyl-N,N'-bis(alkaryl)phosphorodiamidate groups wherein the exact nature of the intermolecular bonds have yet to be ascertained.

The aforedescribed oligomeric phosphorodiamidates are produced by contacting in the absence of catalyst and solvent an alkarylamine of the formula:

R—$NH_2$ where R is as heretofore defined with an O-alkyldihalophosphate of the formula:

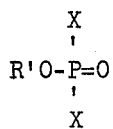

where R' is as heretofore defined and X is chlorine or bromine. The reaction is conducted at a temperature between about 170° and 200°C. utilizing a mole ratio of amine to dihalophosphate of between about 1.7:1 and 2.3:1. During the reaction, the reaction mixture is continuously purged with an inert gas such as nitrogen to remove HCl by-product. Typical inert gas rates are between about 0.4 and 2 mls./min./gram. The reaction period is normally between about 10 and 30 hours. The crude product can be purified by standard techniques, e.g., extraction with an alkane such as normal pentane.

In the foregoing procedure, the defined combination of ingredients, quantities, conditions, the absence of liquid solvent and catalyst, and the employment of the reactant mole ratios are required to produce the oligomeric product and to prevent the formation of the undesired amine hydrochloride by-product salt.

In the preparation of the sulfurized derivative embodiment of the phosphorodiamidate described above, the oligomeric phosphorodiamidate product is reacted with phosphorus pentasulfide ($P_2S_5$) at a temperature between about 80° and 150°C. utilizing a mole ratio of $P_2S_5$ to phosphorodiamidate of between about 0.05:1 and 0.5:1 normally for a period of between about 1 and 6 hours. Under preferred conditions, inert liquid solvent diluent is employed such as liquid aromatic hydrocarbons having a boiling point between about 80° and 130°C., e.g., toluene and benzene. When inert solvent diluent is employed, it normally constitutes between about 20 and 40 wt. % of the reaction mixture. Pressure is employed as necessary to prevent premature volatilization of solvent. At the end of the reaction, the sulfurized product is purified by standard techniques such as filtering the reaction mixture to remove excess $P_2S_5$ and then stripping out the solvent under vacuum to form the sulfurized O-alkyl-N,N'-bis(alkaryl)phosphorodiamidate product having a sulfur content of between about 2 and 8 wt. % and a phosphorus content of between about 4 and 16 wt. %.

Because of the high viscosity of the non sulfurized and sulfurized products, they are preferably diluted, normally on a 50—50 weight basis with a hydrocarbon mineral oil, e.g., a naphthenic oil of an SUS viscosity of about 100 at 100°F. to form a lube oil concentrate for better handling.

Examples of the amine reactants contemplated herein are any alkylated anilines where the total carbons of alkyl groups is from 6 to 18 such as p-hexylaniline, p-nonylaniline, o,p-dibutylaniline, p-tert.-dodecylaniline, and o-octadecylaniline.

Examples of the alkyldihalophosphate reactant contemplated herein are n-butyldichlorophosphate, n-butyldibromophosphate, ethyldichlorophosphate, ethyldibromophosphate, i-propyldichlorophosphate, n-propyldichlorophosphate, amyldichlorophosphate and hexyldichlorophosphate.

Examples of the oligomeric phosphorodiamidates and sulfurized phosphorodiamidates contemplated herein are O-n-butyl-N,N'-bis(p-tert.-dodecylphenyl) phosphorodiamidate mixtures, sulfurized O-n-hexyl-N,N'-bis(tert.-dodecylphenyl) phosphorodiamidate mixtures, O-ethyl-N,N'-bis(p-tert.-dodecylphenyl)phosphorodiamidate mixtures, sulfurized O-isobutyl-N,N'-bis(o,p-dibutylphenyl)phosphorodiamidate mixtures and O-n-pentyl-N,N'-bis(p-octadecylphenyl)phosphorodiamidate mixtures.

The oligomeric phosphorodiamidates and sulfurized phosphorodiamidates of the invention when employed in the lubricant hydrocarbon mineral oil compositions contemplated herein are normally utilized in amounts of between about 1 and 10 wt. %, preferably between about 1 and 4 wt. %, with the lubricating oil base constituting the major component of the composition, e.g., between about 85–99 wt. %. Among the suitable hydrocarbon mineral oil base materials are paraffin base, naphthene base or mixed paraffin and naphthene base distillate or residual oils. Paraffin base distillate lubricating oil fractions are used in the formulation of premium grade motor oils. The lubricating base oil generally has been subjected to solvent refining to improve its lubricity and viscosity-temperature relationship as well as solvent dewaxing to remove waxy components and improved pour of the oil. Broadly speaking, mineral lubricating oils having an SUS viscosity at 100°F. between about 50 and 1,000 may be used in the formulation of the improved lubricants of this invention, but usually the viscosity ranges fall between 70 and 300 at 100°F.

The novel mineral lubricating oil compositions containing the oligomeric phosphorodiamidates and sulfurized oligomeric phosphorodiamidates can contain other additives designed to impart other desirable properties thereto and/or to supplement the oxidation and corrosion inhibiting and load improving effect of the diamidate. Example supplementary additives include VI improvers such as polymethacrylates; detergent dispersants such as alkaline earth metal alkylphenolate, overbased carbonated alkaline earth metal alkaryl sulfonates and ethoxylated inorganic phosphorus acid free, steam hydrolyzed, $P_2S_5$-polybutene (e.g., 1,100 m.w.) reaction product detergent dispersant; and antifoamants such as polymeric siloxanes. In addition, supplementary oxidation and corrosion inhibitors and load improving agents such as a divalent metal alkyl dithiophosphate resulting from the neutralization of a $P_2S_5$-alcohol reaction product with a divalent metal or divalent metal oxide may be employed. Specific examples are the barium and zinc salts of a mixed alcohol (methyl-isobutylcarbonol and isopropanol)-$P_2S_5$ reaction product. The metal dialkyldithiophosphates when used as a supplement are usually present in the lubricant in concentrations of between about 0.05 and 1.5 wt. %.

The following examples further illustrate the products, method of preparation and compositions of the invention but are not to be construed as limitations thereof.

EXAMPLE I

This example illustrates the preparation of the oligomeric phosphorodiamidate product.

In a 500 ml. flask there were mixed 208 grams (0.8 mole) of p-tert.-dodecylaniline with 76.4 grams (0.4 mole) of n-butyldichlorophosphate. The flask was purged with nitrogen and heated gradually to 175°C. and the temperature was maintained with nitrogen purging (200 mls./hour) for 16 hours and finally the reaction mixture was heated to 190°C. for an additional 4 hours with continued nitrogen purging. The product was then kept at 125°C. under reduced pressure (5 mm Hg.) for 1 hour and 242 grams (92% of theory) product was isolated. The resultant product was analyzed and found to contain: % nitrogen 4.3, % phosphorus 4.9, % chlorine 0.4, total acid number (TAN) of 30. Further, analysis found the molecular weight to be 1,880. The analysis indicated the product to be oligomeric O-n-butyl-N,N'-bis(p-tert.-dodecylphenyl)phosphorodiamidate apparently containing an average of about 3 phosphorodiamidic units.

EXAMPLE II

This example illustrates the preparation of the sulfurized oligomeric phosphorodiamidate product.

To a 500 mls. flask 300 grams (equiv. 0.8 mole) of oligomeric phosphoroamidate produced in Example I, diluted on a 1:1 weight basis in naphthenic mineral oil having an SUS viscosity of about 100 at 100°F. were mixed with 5.5 grams (equiv. 0.25 mole) $P_2S_5$ in 150 mls. of toluene. The mixture was purged with nitrogen and heated to reflux (115°C.) for 4 hours, filtered and solvent stripped under reduced pressure. Analysis of the sulfurized O-n-butyl-N,N'-bis(p-tert.-dodecylphenyl)phosphorodiamidate found the following: wt. % P 3.2, wt. % S 1.1, wt. % N 2.2, TAN of 40.

EXAMPLE III

This example further illustrates the preparation of the oligomeric phosphorodiamidate product.

The procedure employed calls for mixing p-tert.-dodecylaniline with n-butyldichlorophosphate in a 500 mls. flask in the absence of base and solvent and heating and maintaining the reaction mixture in a temperature range of 170° to 200°C. for a period of 18 to 30 hours under a continuous nitrogen purging. The product was then purified by reducing pressure to 5 mm Hg. at 125°C. for a period of 1–2 hours. The product in all cases was determined to be essentially trimeric O-n-butyl-N,N'-bis(t-dodecylphenyl)phosphorodiamidate.

The test data and results for five runs are reported below in Tables I and IA:

TABLE I

Reactants, Quantities and Conditions

| Run No. | t-dodecyl-aniline, mole | n-Butyl dichloro-phosphate, mole | React. Temp., °C. | React. Time, Hrs. |
|---|---|---|---|---|
| A | 0.4 | 0.2 | 190 | 24 |
| B | 0.8 | 0.4 | 175 | 16 |
|   |     |     | 190 | 4 |
| C | 0.8 | 0.4 | 175 | 16 |
|   |     |     | 190 | 4 |
| D | 2.4 | 1.2 | 190 | 20 |
| E | 2.4 | 1.2 | 190 | 18 |

TABLE IA

Product Data

| Run No. | Yield, g.* | Theory Yield, Wt. % | P | N | Cl | TAN |
|---|---|---|---|---|---|---|
| A | 211 | 85 | 2.6 | 2.3 | .27 | 42 |
| B | 386 | 75 | 2.2 | 2.3 | .30 | 24 |
| C | 380 | 74 | 2.9 | 2.5 | .33 | 26 |
| D | 1250 | 80 | 2.7 | 2.3 | .72 | 38 |
| E | 1410 | 91 | 2.7 | 2.5 | .23 | 35 |

*Weight of a 1:1 weight ratio of diamidate and naphthene lube oil of 100 SUS viscosity at 100°F.
**Based on the 1:1 oil solution.

EXAMPLE IV

This example further illustrates the preparation of the sulfurized phosphorodiamidate derivatives.

The procedure employed calls for the mixing of the oligomeric O-n-butyl-N,N'-bis(tert.-dodecylphenyl)-phosphorodiamidate prepared in Example III, Run D with phosphorus pentasulfide in the presence of toluene of a period of 5 hours under reflux conditions (115°C.) while continuously purging with nitrogen and filtering the resultant material followed by stripping off toluene at up to 100°C. under 5 mm Hg. The test data and results for six runs are reported below in Tables II and IIA:

TABLE II

Reactant, Quantities and Conditions

| Run No. | Mole Ratio $P_2S_5$ Amidate | Amidate, Mole | Toluene Mls. | React. Temp., °C. | React. Time, hrs. |
|---|---|---|---|---|---|
| F | 0.2:1 | 0.1 | 100 | 110 | 3 |
| G | 0.2:1 | 0.1 | 100 | 110 | 3 |
| H | 0.2:1 | 0.1 | 100 | 110 | 3 |
| I | 0.2:1 | 0.5 | 100 | 115 | 6 |
| J | 0.2:1 | 0.5 | 300 | 112 | 6 |
| K | 0.1:1 | 0.5 | 300 | 112 | 3 |

TABLE IIA

Product Data

| Run No. | *Yield 50% Active | Yield, % Theory | P | N | S | TAN |
|---|---|---|---|---|---|---|
| F | 114 | 89 | 3.8 | 2.2 | 2.3 | 42 |
| G | 116 | 90 | 3.8 | 2.5 | 2.1 | 36 |
| H | 110 | 87 | 3.9 | 2.4 | 1.8 | 35 |
| I | 610 | 95 | 3.6 | 2.3 | 2.2 | 59 |
| J | 610 | 95 | 3.7 | 2.4 | 2.2 | 56 |
| K | 610 | 95 | 3.4 | 2.5 | 1.4 | 56 |

*Diluted in naphthene lube oil of 100 SUS viscosity at 100°F. on a 1:1 weight ratio basis.
**Based on the 1:1 oil-diamidate mixture.

EXAMPLE V

This example illustrates the oxidation and corrosion inhibiting effect and load improving ability of the oligomeric phosphorodiamidate and sulfurized phosphorodiamidate products of the invention as well as illustrating the lubricant compositions of the invention.

The tests employed are as follows:

A. Four-Ball Wear Test described in U.S. Pat. No. 3,050,466 measures load carrying ability of the test oil in terms of scar diameter on a steel ball with increasing scar diameter denoting decreasing load carrying ability.

B. The MacCoull Corrosion Test described in U.S. Pat. No. 2,709,682 measures oxidation and corrosion inhibiting ability of the test oil, the corrosion being measured in terms of bearing weight loss and Neut. No., the greater the bearing weight loss and Neut. No. increase, the greater the corrosion; the greater the viscosity increase the greater the degree of oxidation.

C. Copper Strip Corrosion Test (ASTM D-130-68) which consists of placing a copper strip in the test composition for a period of 3 hours at 212°F. and then giving the strip a rating of from 1 to 5, 1 representing none to slight tarnish and 5 representing heavy corrosion. Further, a rating of 1B represents a greater degree of tarnish than a 1A rating.

D. Oxidation Absorption Test described in "The Review of Scientific Instruments," Vol. 42, No. 4, pgs. 471–474, April 1971 consists of passing oxygen into the test composition maintained at a temperature of 340°F. and measuring the period of time which it takes to absorb 500 mls. of oxygen. The longer the time to absorb the 500 mls. of oxygen, the greater resistance to oxidation.

The materials employed in the above tests and their shorthand designation are as follows:

1. OP:1:1 wt. ratio composition of naphthenic lube oil (~ 100 SUS at 100°F.) and trimeric O-n-butyl-N,N'-bis(t-dodecylphenyl) phosphorodiamidates, the composition having a P content of 2.9 wt. % and an N content of 2.5 wt. % and prepared in Example III, Run C.
2. SOP:1:1 wt. ratio composition of naphthenic lube oil (~ 100 SUS at 100°F.) and $P_2S_5$ sulfurized trimeric O-n-butyl-N,N'-bis (t-dodecylphenyl)phosphorodiamidate, the composition having a wt. % P of 3.8, wt. % N of 2.5 and wt. % S of 2.1 and prepared in Example IV, Run G.
3. Zn Salt:Zinc salt of mixed alcohol (methylisobutylcarbinol and isopropanol)-$P_2S_5$ in mineral lubricating oil containing about 9.5 wt. % Zn formed by reacting methylisobutylcarbinol and isopropanol with $P_2S_5$ in a ratio of about 2.7:2.3:1 and then forming zinc salt with zinc oxide.
4. Base Oil A:Paraffinic lubricating oil of an SUS viscosity of about 340 at 100°F.
5. Base Oil B:Paraffinic lubricating oil of an SUS viscosity of about 340 at 100°F. containing calcium carbonate overbased calcium sulfonate and ethoxylated, inorganic phosphorus acid free, steam hydrolyzed polyisobutylene (1,100 m.w.)-$P_2S_5$ reaction product, said base oil having a 0.0375 wt. % P and 0.35 wt. % Ca content.

The test data and results are reported below in Tables III and IIIA:

TABLE III

| Run | Additive | Compositions Additive Wt. % | Base Oil | Wt. % P* |
|---|---|---|---|---|
| I | None | 0 | A | 0 |
| II | OP | 4 | A | 0.12 |
| III | SOP | 4 | A | 0.15 |
| IV | Zn Salt | 1.1 | A | 0.10 |
| V | OP | 4 | B | 0.12 |
| VI | SOP | 4 | B | 0.15 |
| VII | Zn Salt | 1.1 | B | 0.10 |
| VIII | OP | 3 | B | 0.07 |
|  | Zn Salt | 0.42 |  | 0.04 |
| IX | SOP | 3 | B | 0.11 |
|  | Zn Salt | 0.42 |  | 0.04 |
| X | Zn Salt | 0.42 | B | 0.04 |
| XI | None | 0 | B | 0 |

*Derived from Additive.

TABLE IIIA

| | Oxidation, Corrosion, Wear Data | | | | | |
|---|---|---|---|---|---|---|
| | 4-Ball[a] Wear | MacCoull | | | Cu | O |
| Run | Scar Diam. mm | BWL g. | N.N. | Visc. Incr.% | Strip Corr.[b] | Adsorp., Hrs.[c] |
| I | 1.03 | 172 | 12.8 | 400 | 1A | 17 |
| II | 0.54 | 4 | 1 | 5 | 1A | 44 |
| III | 0.37 | 6 | 1 | 5 | 2B | 45 |
| IV | 0.37 | 4 | 1.1 | 5 | 1A | 20 |
| V | 0.72 | 44 | 2.3 | 19 | 1B | 26 |
| VI | 0.40 | 5 | 1.5 | 14 | 2C | 25 |
| VII | 0.39 | 4 | 2.9 | 12 | 1A | 10 |

TABLE IIIA-Continued

| | Oxidation, Corrosion, Wear Data | | | | | |
|---|---|---|---|---|---|---|
| | 4-Ball[a] Wear | MacCoull | | | Cu | O |
| Run | Scar Diam. mm | BWL g. | N.N. | Visc. Incr.% | Strip Corr.[b] | Adsorp., Hrs.[c] |
| VIII | 0.39 | 3 | 1.7 | 15 | 1B | 21 |
| IX | 0.35 | 3 | 2.2 | 20 | 1B | 21 |
| X | 0.36 | 90 | 9.1 | 130 | 1A | 4 |
| XI | 1.00 | 185 | 140 | 450 | 1A | 2 |

[a] 2 hrs., 40 kg., 200°F., 600 RPM
[b] 3 hrs. at 212°F.
[c] Hrs. to absorb 500 mls. of $O_2$ In the foregoing table the reason compositions based on Oil B are poorer than compositions based on Oil A in the oxidation area is because of the pro-oxidant effect of the overbased calcium sulfonate ingredient therein.

I claim:
1. A method of preparing a sulfurized reaction product of an oligomeric O-alkyl-N,N'-bis(alkaryl)phosphorodiamidate having an average between about 1 and 4 phosphorodiamidic groups, a sulfur content between about 2 and 8 wt. % and a phosphorus content of between about 4 and 16 wt. % comprising:
   1. first contacting an amine of the formula $RNH_2$ where R is alkaryl of from 12 to 24 carbons with an alkyl dihalophosphate of the formula:

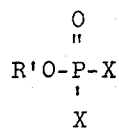

where R' is alkyl of from 2 to 6 carbons and X is chlorine or bromine utilizing a mole ratio of said amine to said dihalophosphate of between about 1.7:1 and 2.3:1 at a temperature between about 170° and 200°C. in the absence of inert diluent solvent and in the absence of catalyst while continuously blowing the reaction mixture with an inert gas and recovering the oligomeric phosphorodiamidate first reaction product,
   2. second contacting said first reaction product with phosphorus pentasulfide in the presence of an inert liquid diluent at a temperature between about 80° and 150°C. while continuously purging the reaction mixture with an inert gas utilizing a mole ratio of phosphorus pentasulfide to said first reaction product of between about 0.05:1 and 0.5:1 and recovering said sulfurized reaction product.

2. A method in accordance with claim 1 wherein said R is p-tertiary dodecylphenyl, R' is n-butyl, X is Cl and said sulfurized reaction product contains an average of about three phosphoroamidic groups.

3. The sulfurized reaction product of claim 1.

4. The sulfurized reaction product of claim 3 where R is p-tert.-dodecylphenyl, R' is n-butyl, X is chlorine and said sulfurized reaction product contains about 3 phosphorodiamidic groups.

* * * * *